United States Patent
Johnson

(10) Patent No.: US 7,584,452 B1
(45) Date of Patent: Sep. 1, 2009

(54) SYSTEM AND METHOD FOR CONTROLLING THE VISIBILITY AND USE OF DATA IN A PROGRAMMING ENVIRONMENT

(75) Inventor: Steve Johnson, Sudbury, MA (US)

(73) Assignee: The Math Works, Inc., Natick, MA (US)

( * ) Notice: Subject to any disclaimer, the term of this patent is extended or adjusted under 35 U.S.C. 154(b) by 1042 days.

(21) Appl. No.: 10/955,399

(22) Filed: Sep. 29, 2004

(51) Int. Cl.
G06F 9/44 (2006.01)
G06F 9/45 (2006.01)

(52) U.S. Cl. .................. 717/116; 717/114; 717/140
(58) Field of Classification Search ............. 717/116
See application file for complete search history.

(56) References Cited

U.S. PATENT DOCUMENTS

| 5,740,443 A * | 4/1998 | Carini ................ 717/133 |
| 6,467,079 B1 * | 10/2002 | Ettritch et al. ........... 717/108 |
| 2003/0066056 A1 * | 4/2003 | Petersen et al. .......... 717/137 |
| 2005/0028151 A1 * | 2/2005 | Roth et al. ............. 717/162 |

OTHER PUBLICATIONS

Flanagan, "JavaScript: The Definitive Guide, 4th Edition," 2001 O'Reilly & Associates.*

* cited by examiner

Primary Examiner—Lewis A Bullock, Jr.
Assistant Examiner—Insun Kang
(74) Attorney, Agent, or Firm—Lahive & Cockfield, LLP; Kevin J. Canning

(57) ABSTRACT

The declaration of a variable of a new storage class from within a function creates a shared variable and a local variable. The shared variable may be a hidden (private) global variable and the local variable may be a hidden (private) local variable. The shared variable has a modified global scope and is callable only from within a function. The local variable is visible only from within the function in which it is defined. References to the variable from within a function result in the value of the shared variable being returned. The value of the shared variable is the value most recently assigned to the variable by an active caller of the function. Upon entering a function referencing the variable, the value of the shared variable is given to the local variable. When the function returns, the value of the local variable is assigned back to the shared variable.

36 Claims, 6 Drawing Sheets

SYSTEM AND METHOD FOR CONTROLLING THE VISIBILITY AND USE OF DATA IN A PROGRAMMING ENVIRONMENT

FIELD OF THE INVENTION

The illustrative embodiment of the present invention relates generally to the processing of code in a computing environment, and more particularly to a method of controlling the visibility or use of data by program modules through the use of a custom storage class.

BACKGROUND

In recent years, programming projects have grown significantly in complexity without a corresponding significant change to the mechanisms in programming languages that are used to control and perform operations such as memory allocation, error handling and language processing. As a result of this lack of change in the mechanisms, software productivity has seen very little improvement despite an abundance of inexpensive hardware. Software projects frequently fail to meet budget or schedule restrictions as a result of the need to perform explicit accident-prone coding.

Computer programs are often divided into high-level interface code that interfaces an application to other applications and users, "middleware" that carries out specific instructions for the application, and "infrastructure", a layer of code that is concerned with low-level utility issues such as event processing, memory allocation, multi-threading, and error processing. The interface code may be referred to as high-level because it may be conceptualized as sitting on top of the application as the vehicle through which the application interacts with other applications and users. The infrastructure may be referred to as "low-level" as it takes care of basic operations necessary for the application to function. The middleware may be thought of as being the other code in the application that is neither the high-level interface code, nor the low-level infrastructure code and may be conceptualized as being between the two other types of code in an application.

It is frequently the case that information from the high-level interface code is needed in the middleware programs, and high-level interface code and middleware information is needed in the infrastructure. Conventionally there have been two ways to provide higher level information in an application to lower levels. First, information may be left in global or external storage where lower level routines can access it directly. Alternatively, information may be passed down from the higher to lower levels using function arguments. Every function called between the creator of the higher-level information and the ultimate user has to pass the information along, even if the intermediate function does not need the information.

Each method of passing information is subject to certain drawbacks. The global variable method which universally exposes the information works quickly but is subject to bugs. It is difficult or impossible to use the global variable method when there is multi-threading or parallelism in the environment since the global variables may be accessed and/or set by multiple program modules. The information in the global variables which is needed at lower levels may not have not have been stored or updated in global variables, the information may be initially stored in the global variable correctly and then overwritten, or information may be placed in a global variable and then not removed at the proper time with the result that the information remains in the global variables after it is no longer valid.

Unfortunately, the argument passing method also is subject to difficulties. The argument passing method may significantly interfere with the readability and performance of programs. Many middleware routines must pass information from their caller to the functions they call, without this information being used directly. This creates additional overhead in the computing environment. The drawbacks to the global variable method and the argument passing method tend to increase as programs get larger. Typically, information is needed by only a few functions that create the information and a few that use it, but both of these methods make this information available to lots of functions that do not need it. This makes programs harder to understand, since the flow of information is unclear, and when programs are hard to understand, bugs in the programs multiply.

Programmers have attempted to deal with the shortcomings of the global variable method and the argument passing method by creating a context structure or object, which is passed as a single additional argument. However, this has many of the problems of both of the above methods as programs get bigger. The context structure or object method suffers from the difficulties of the global variable method since various fields of the context may be undefined or may have become obsolete. The context structure and object method also suffers from the problems of the argument passing method by giving programs visibility to information that is not needed, while providing difficult access to the information that is needed.

An additional related problem arises frequently when accessing data that is truly global in nature, such as characteristics of the user's screen, settings particular to the hardware (such as rounding mode), and operating system and application options (such as the length or degree of detail of error messages, or whether certain errors should be ignored). It is quite common when dealing with such information that the user creates a temporary variable to hold the previous value of the setting or option, sets the option as desired, and then continues with the computation. At some later time, the option is reset to its earlier setting. Unfortunately, this sort of operation requires additional hand coding and the programmer must remember to restore the proper value at the proper point.

SUMMARY

The illustrative embodiment of the present invention provides a new storage class which addresses the shortcomings of the global variable method and argument passing methods used to provide parameters to lower level functions and methods. The declaration of a variable of the new storage class from within a function creates a shared variable and a local variable in response to the declaration. The shared variable may be a hidden(private) global variable and the local variable may be a hidden(private) local variable. The shared variable has a modified global scope and is callable only from within a function and the local variable is visible only from within the function in which it is defined. References to the variable from within a function result in the value of the shared variable being returned. The value of the shared variable is the value most recently assigned to the variable by an active caller of the function. Upon entering a function referencing the variable the value of the shared variable is given to the local variable. The local variable holds that value until the function returns at which time it is assigned back to the shared variable. The holding of the value of the shared variable as it exists upon entry to the function by the local variable assures the restoration of the shared variable upon the function returning without additional coding. Although particularly applicable to structured programming languages, the illustrative embodiment of the present invention may also be employed in an object-oriented environment.

In one embodiment, an electronic device with a computing environment that includes a language processor executes a method of distributing data to called functions in an application within the computing environment. The method uses a language processor to provide a specified type of variable that is referenceable only from within a function. The method also provides, in response to the use of a variable of the specified type by a specific function, the value most recently set by the specific function or a caller of the specific function.

In another embodiment, an electronic device with a computing environment that includes a language processor includes a medium that holds executable steps for a method of distributing data to called functions in an application within the computing environment. The method uses a language processor to provide a specified type of variable that is referenceable only from within a function. The method also provides, in response to the use of a variable of the specified type by a specific function, the value most recently set by the specific function or a caller of the specific function.

In another embodiment, an electronic device with an object-oriented computing environment executes a method which declares a variable of global scope. The method also creates a class with a constructor and destructor. The constructor creates a local copy of the variable with global scope. The method calls the constructor and assigns the current value of the variable with global scope to the local copy of the variable when the object is instantiated. References to the variable within the object's methods return the value of the variable with global scope which is the value most recently assigned to the variable with global scope by an existing object. The method calls a destructor for the object and automatically restores the value held by the local copy of the variable to the variable with a global scope when the object is destroyed.

In another embodiment, an electronic device with an object-oriented computing environment includes a medium that holds executable steps for a method that declares a variable of global scope. The method also creates a class with a constructor and destructor. The constructor creates a local copy of the variable with global scope. The method calls the constructor and assigns the current value of the variable with global scope to the local copy of the variable when the object is instantiated. References to the variable within the object's methods return the value of the variable with global scope, which is the value most recently assigned to the variable with global scope by an existing object. The method calls a destructor for the object and automatically restores the value held by the local copy of the variable to the variable with a global scope when the object is destroyed.

In one embodiment, an electronic device with a programming environment executes a method of distributing data to called functions in an application which provides a variable type with a defined scope and visibility. A variable of the defined type is declared in a selected function. In response to the declaration, a global variable and local variable are created programmatically, the global variable referenceable only from within a function, the local variable visible only within the function in which the declaration appears. The method also automatically assigns the value of the global variable to the local variable when the function is entered and returns the value of the global variable when the declared variable is referenced within the function, the value being a value most recently assigned to the variable by an active caller of the function. Furthermore, the method programmatically assigns the value of the local variable to the global variable when the function returns.

In an embodiment, an electronic device with a computing environment that includes a language processor executes a method of distributing data to called functions in an application within the computing environment. The method creates a storage class describing how a variable is stored. A variable of the storage class is declared in a selected function, and in response a hidden variable with global scope and hidden local variable are automatically created by the language processor. The hidden variable with the global scope is referenceable only from within a function and the hidden local variable is visible only within the function in which the declaration appears. The method assigns the current value of the hidden variable with global scope to the hidden local variable whenever a function which references the variable is entered. References to the variable within the function return the value of the hidden variable with global scope which is the value most recently assigned to the variable by an active caller of the function (i.e. a function that hasn't returned yet and is still on the function call stack). The method automatically restores the value held by the hidden local variable to the hidden variable with a global scope upon the function returning.

DETAILED DESCRIPTION

Figure 1:
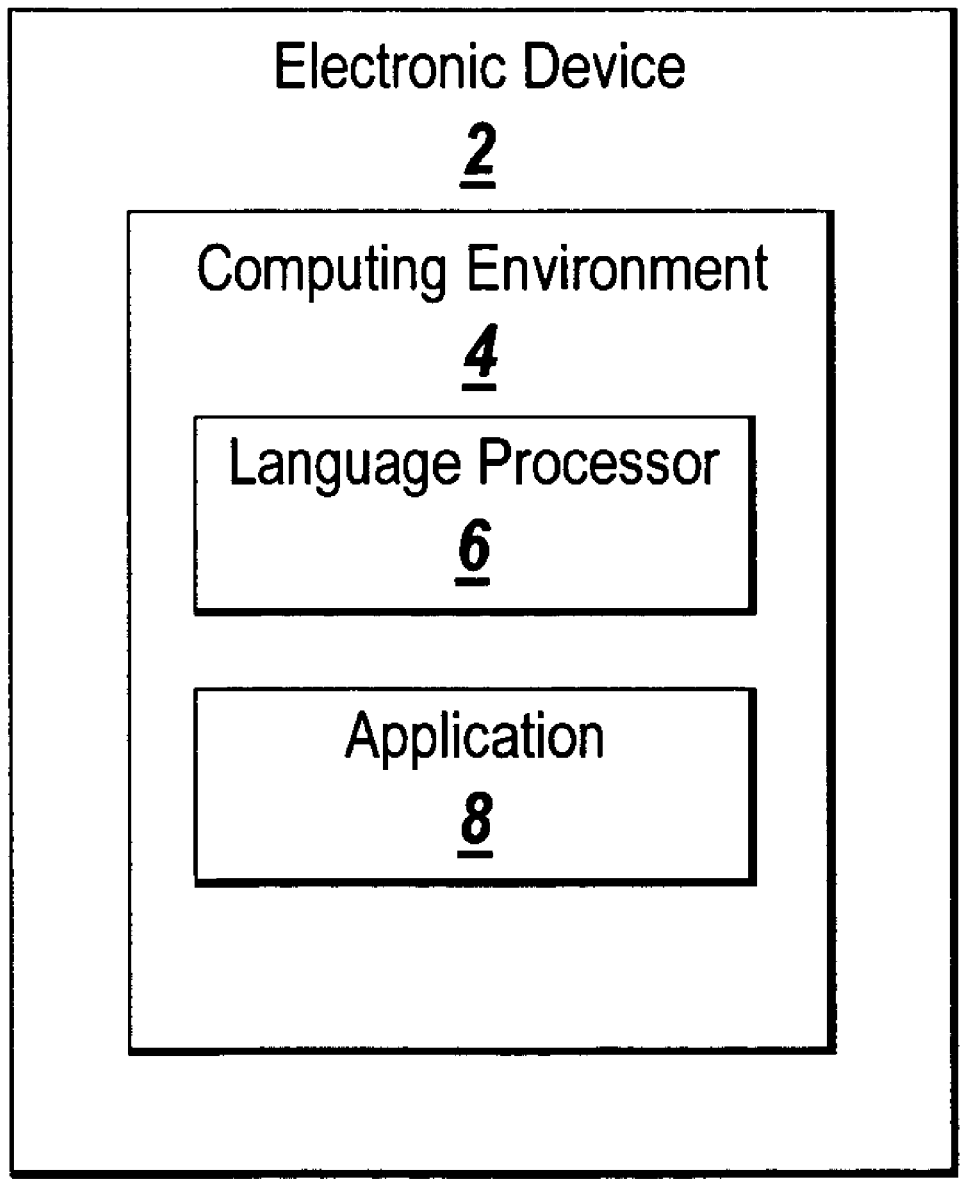
FIG. 1 depicts an environment suitable for practicing the illustrative embodiment of the present invention.

The illustrative embodiment of the present invention provides a custom storage class that can be used to scope variables that would otherwise require large amounts of explicit, accident-prone coding. It is applicable to structured and object-oriented computer languages (including C, C++, and the Java™ programming language), and can be used to simplify memory allocation, error handling, language processing, and compilers among other applications. JAVA is a trademark of Sun Microsystems, Inc. of Santa Clara, Calif. The custom storage class embodies the positive aspects of using a global variable while restricting the variable usage such that the opportunity for variable values to be inadvertently altered is greatly reduced. Additionally, the custom storage class provides a mechanism to efficiently pass needed parameter values from high level interface code and middleware to infrastructure code in an overhead-friendly manner.

The illustrative embodiment of the present invention makes use of a new custom storage class. A "storage class" describes how a variable is stored, when the variable is created and destroyed, and when programs can set or use the variable value. Those skilled in the art will recognize that despite the use of the word "class", storage classes are found in structured programming languages such as C in addition to object-oriented environments. The new storage class of the present invention will be referred to herein as "environ" for sake of clarity, but those skilled in the art will recognize that the name of the custom storage class is an implementation choice. Those skilled in the art will also recognize that although many of the examples contained herein refer to the C programming language, the illustrative embodiment of the present invention is also applicable to other structured and non-structured programming languages such as the JAVA programming language, C++, and MATLAB. While the inventive concepts remain the same, the particular implementation of the present invention will vary somewhat from language to language in a manner understood by those skilled in the art.

In the C programming language, variables have a type and a storage class. The type describes the size and the meaning of the value of the variable. Typical types in C are integers, pointers to characters, and structures that are made up of other types. As mentioned above, the storage class in C describes how a variable is stored, how the value is created and destroyed, and when programs can set or use that value. Typical storage classes in C are extern, referring to a global variable, and automatic or local, referring to a variable whose visibility is limited to the function where it is defined. The illustrative embodiment of the present invention provides a new storage class, referred to herein as "environ". The environ storage class provides a shared variable with a modified global scope. A function can declare a variable environ, and when this variable is referenced within a function, the value returned is the value most recently assigned to the variable by any active caller of the function. When the variable is set within a function, the function that sets the variable and all functions that that function calls will see the new value. However, when the function that set the variable returns, the value seen by callers to the setting function reverts to what it was when the setting function was called. The environ storage class also dictates that the variable can neither be set nor used from outside of a function.

FIG. 1 depicts an environment suitable for practicing the illustrative embodiment of the present invention. An electronic device 2 includes a computing environment 4. The electronic device 2 may be a workstation, laptop, server, mainframe, PDA or some other type of electronic device capable of supporting the computing environment 4. The computing environment 4 may be a structured programming language environment such as C or an object-oriented programming environment such as C++ or the JAVA programming language environment. The computing environment 4 includes a language processor 6. The language processor 6 is used by the computing environment 4 to process the code of one or more applications 8. Those skilled in the art will recognize that the one or more applications 8 may not originally be stored on electronic device 2 but may instead be accessed over a network.

The, illustrative embodiment of the present invention may be implemented in a single thread or multiple thread architecture. In a single thread architecture, such as found in most C and C++ environments, the implementation will be described herein as a transformation of C code although those skilled in that art will realize that the equivalent operations may be carried out by a language processor that implements this invention.

A function f in the illustrative embodiment of the present invention may contain a line:
environ X;

declaring a variable X of type environ (the new custom storage class). In response to the declaration a hidden extern variable X is created, of the same type and size as X. The extern variable X is a shared variable of modified global scope that may only be referenced from within a function. The extern variable is "shared" in the sense that it may be accessed from more than one function in an application subject to the rules of the storage class. A hidden local variable in f (referred to herein as "_X") is also created. The custom storage class environ dictates what happens when the variable X is assigned to, and what happens when the functions, or a function f calls, is entered and returned from. All references to X within a function get the value in the extern variable. All sets of X within a function set the extern variable. When a function that references X is entered, the local variable _X is assigned the value of the external variable X When the function referencing X returns, the external variable X is assigned the value of the internal local variable _X which is holding the value of the external variable as it existed when the function was first entered. This reassigning of the value of _X to X provides an automated mechanism through the use of the storage class to restore values to a variable with extern scope without manual coding of temporary variables. Those skilled in the art will recognize that there are a number of optimizations that can be done to this basic procedure. If f never sets X, the steps of assigning X to _X and restoring X from X maybe omitted. Also, if the function conditionally sets X, the assigning of the value of X to _X may be delayed until the first set, if any, of X, and accordingly the restoration step only need be performed if the conditional set took place. If a function never sets or references X, the function need take no notice of it and do nothing special on entry or return, thus saving the overhead incurred in the argument passing method where every interim function had to handle parameters to pass them on to later functions regardless of whether the particular function needed the parameter.

The situation where an existing global variable is saved and set, and then later restored, can be directly handled by environ. The use of environ to access external variables automatically saves and then restores the extern variable, and does so more in a more reliable manner than explicit programming. In environments where special functions must be called to set and get parameters, environ may be used to extend these functions. A new function, sete, can be defined:
sete("parameter", value)

that sets the desired parameter to the value, just like set, but when the function calling sete returns, the original value is restored.

Figure 2:
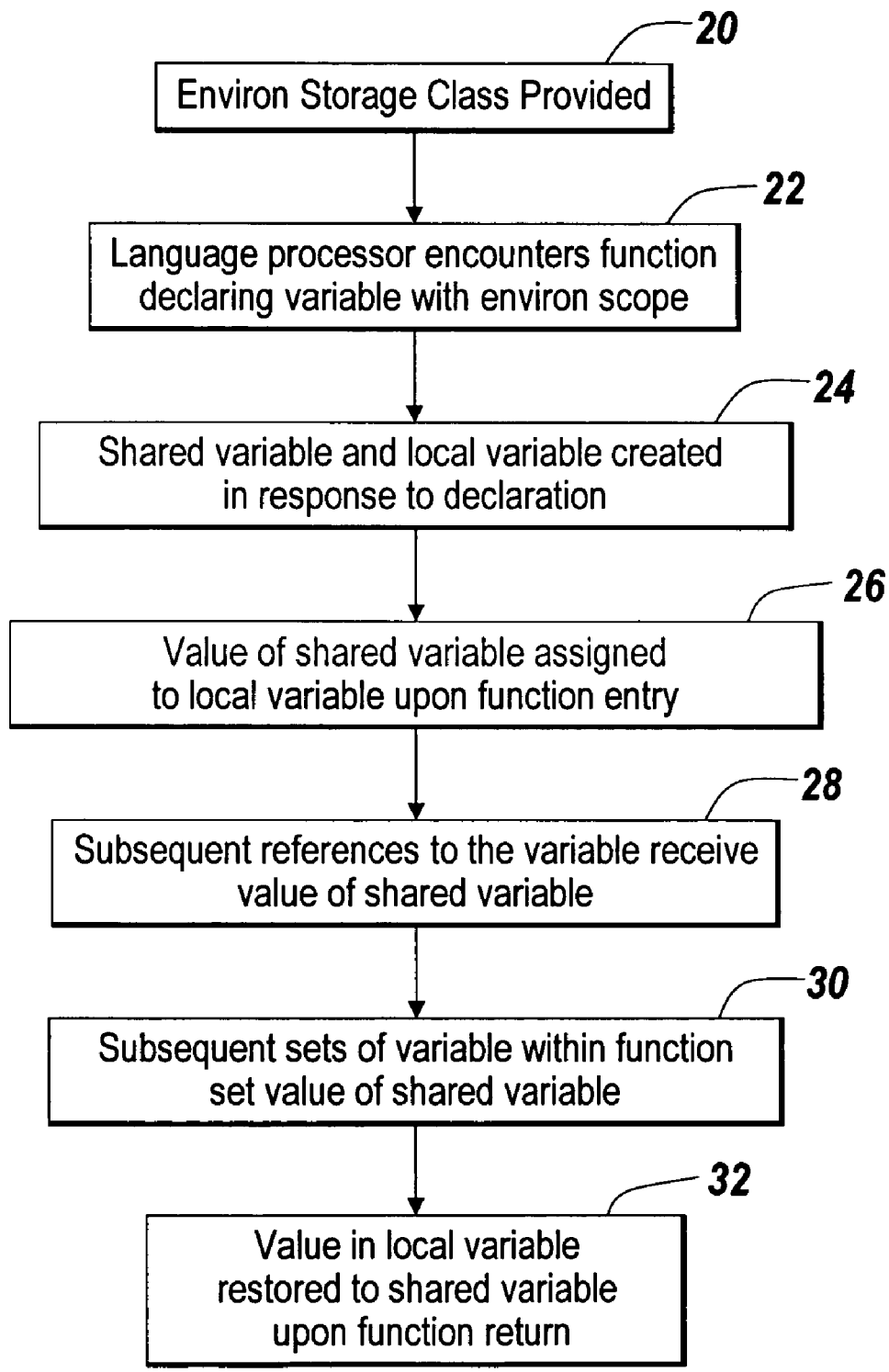
FIG. 2 is a flow chart of the sequence of steps followed by the illustrative embodiment of the present invention to utilize the custom storage class.

FIG. 2 depicts the sequence of steps followed by the illustrative embodiment of the present invention to use the custom storage class to control the distribution of data in a program. The sequence begins with the provision of the environ storage class to the computing environment 4 (step 20). The language processor 6 encounters a function within an application 8 that declares a variable with storage class environ (step 22). A shared variable is created based on the declaration as is a local variable (step 24). Upon entering a function referencing the variable of type environ, the local variable is assigned the value of the shared variable by the language processor 6 (step 26). All references to the variable of type environ within a function that are subsequently detected by the language processor 6 result in the value of the shared variable being used (step 28). All sets of the variable within a function set the value of the shared variable (step 30). Upon return of the function referencing the variable of type environ, the value held by the local variable is restored to the shared variable (step 32). The illustrative embodiment of the present invention thus automatically restores the original value of the shared variable upon exiting a function that had used the variable. This limits the possibility of a programmer inadvertently accessing and using incorrect values associated with a variable of global scope. The requirement that the environ class variables may only be referenced from within a function enforces the automatic restoration of values and dictates that the value that is visible will depend upon the most recent calling function on the call stack.

Additional aspects of the use of the custom storage class will be apparent to those skilled in the art. In the example presented above, there is only a single environ variable of a given name. However, programming languages have a variety of means of allowing names to be restricted to portions of the application, using different language features, including features known as namespaces or modules or packages. The above described use of an environ custom storage class can be modified to allow environ variables to engage in the same kinds of name hiding as other names in the language. Similarly, when debugging a program the debugger typically has means of obtaining the value of a variable by name. The debugger may be modified to reference those environ variables visible within the current function being debugged. Likewise, it is frequently convenient to initialize variables so that use of a variable before it is defined can be detected. Programming languages have a variety of ways of ensuring this behavior, which may be employed to allow environ variables to be initialized.

Another use of the environ storage class is to compile a program. Compiling uses information such as the compiler options, the input file name, and the names of temporary files that are established by the high-level driver program but needed by the infrastructure. In many cases, these settings (especially the compiler options) may be overridden by pragma statements or by the compiler recognizing situations where the options do not apply or are inadvisable. These overrides typically apply only for a single function or a single file, making them an ideal situation in which to use the environ invention. The high-level driver program creates environ variables and stores their initial settings. Intermediate processors could, if desired, modify these settings for a particular function or file. The infrastructure routines would always see the appropriate environment for their work, and the overhead would be minimal. The use of the custom storage class results in a structured form of extern variable that avoids most of the problems with the usual use of extern.

Figure 3A:
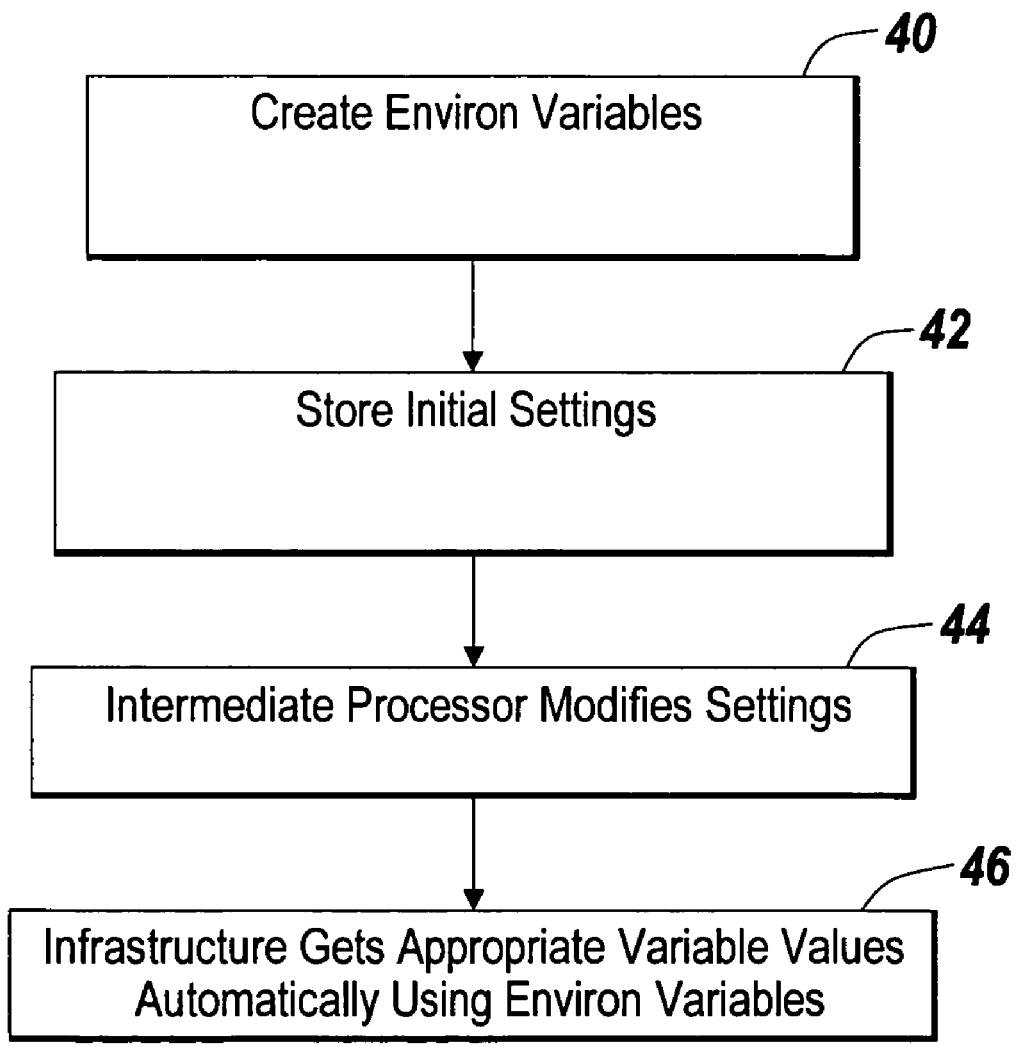
FIG. 3A is a flow chart of the sequence of steps followed by the illustrative embodiment of the present invention to use the present invention with a compiler.

FIG. 3A depicts the sequence of steps followed by the illustrative embodiment of the present invention to use the present invention with a compiler. The sequence starts with the creation of environ variables (step 40). The initial settings for the environ variables are then stored (step 42). Following the storing of the initial settings, intermediate processors may modify the settings (step 44) and the infrastructure will still be able to obtain appropriate variable values through the use of the custom storage class (step 46).

The illustrative embodiment of the present invention may also be used for memory allocation. For example, in C, many low level routines (e.g., a string package) allocate storage for strings using a memory allocator that is part of the environment of the caller. This allows the caller to use efficient memory allocation schemes such as an arena-based allocator, if desired, and also allows the called to ensure that all allocated memory is freed at the appropriate time. Additionally, it is also desirable to provide reasonable defaults for those programs that do not need to provide a special allocator. Unfortunately, memory allocation is not just a single function: an allocation package typically contains at a minimum a routine to allocate memory, a routine to free memory, a routine to grow (reallocate) a block of memory, a routine to report errors if there is no more memory, and a routine to query the amount of free memory remaining. Putting five or more arguments onto every call to a string routine would be cumbersome, and make the application run slowly. At the same time, setting multiple global variables could easily result in other clients of the string package (for example, a GUI package) getting their storage allocated (and potentially freed) by the wrong allocation package. It should be noted that the string package could just publish and initialize external variables with the names of the allocation routines in them. It would not have to know anything about environ. However, by using the present invention, a client of this package could use environ to override the string package's defaults only for its own uses of the package.

The custom storage class of the present invention may also be used in debugging. Frequently, it is desirable to trap all the calls to a particular function. In fact, many storage allocators have "debugging" versions that check for memory leaks. The environ mechanism can allow a debugging version of an allocator to run only on a particular module in the application, reducing overhead and providing a more focused debugging environment.

Executing programs may throw errors, transferring control to some caller of the function that throws the error, a process known as error handling. The illustrative embodiment of the present invention may be used to perform error handling. During error handling, the call stack is unwound to discover what needs to be done to simulate a return from the intermediate functions on the stack. The restoration of previous values is done as part of this unwinding process and may be performed using the techniques outlined above.

Figure 3B:
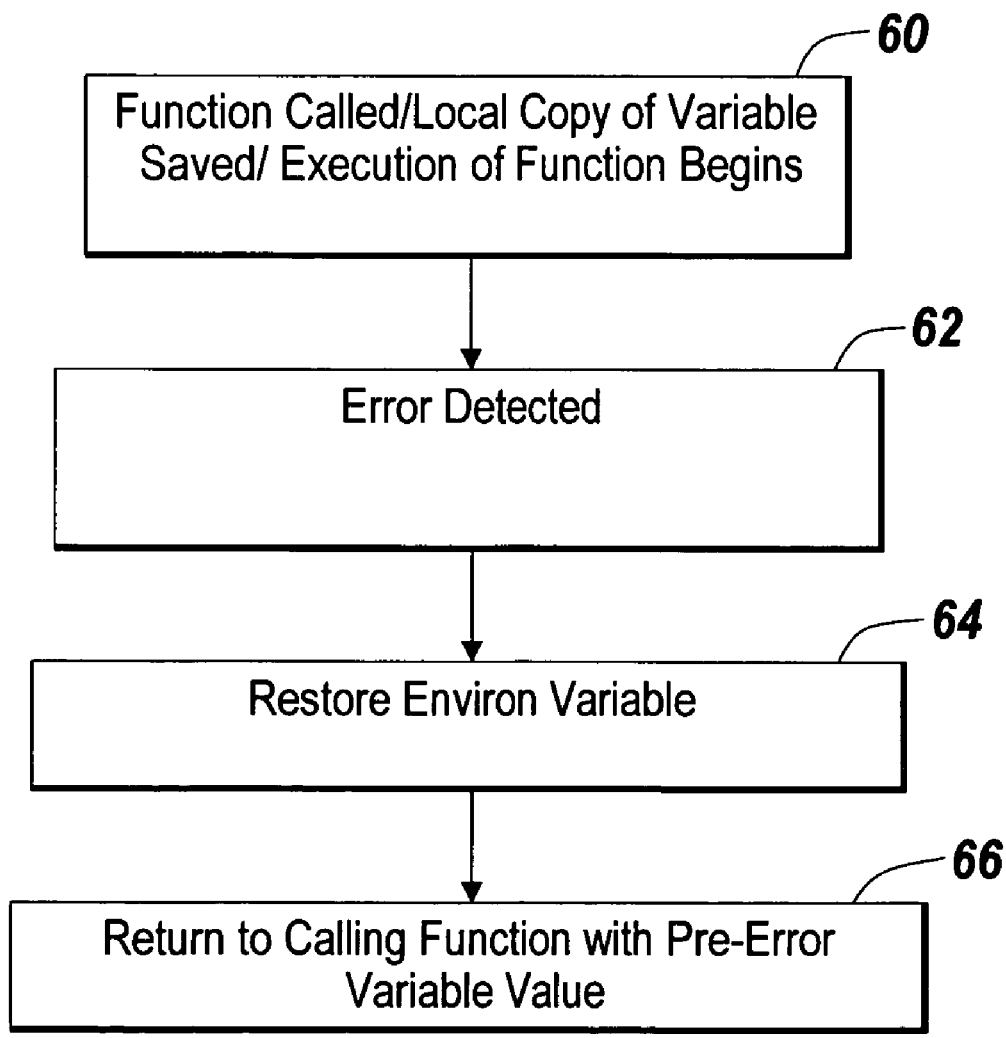
FIG. 3B is a flow chart of the sequence of steps followed by the illustrative embodiment of the present invention in error handling.

FIG. 3B depicts the sequence of steps followed by the illustrative embodiment of the present invention to perform error handling. The sequence starts when a function is called, a local copy of an environ variable is saved upon entry, and execution of the function begins (step 60). Subsequently, an error is detected (step 62) and the environ variable is restored (step 64) as the function in which the error was detected is exited. Control is then returned to the calling function (step 66) with the pre-error value restored to the variable.

The present invention may also be implemented in a multi-thread environment. In a multi-thread environment, there is no unique "caller" of a function f since there can be several threads active with several copies off having several different callers. The custom storage class environ behaves just as in the single thread case. There is a separate external variable in each thread that is used to save the caller's value of the environ variable. Each thread behaves with single-thread semantics, and the implementation is as above.

Figure 4:
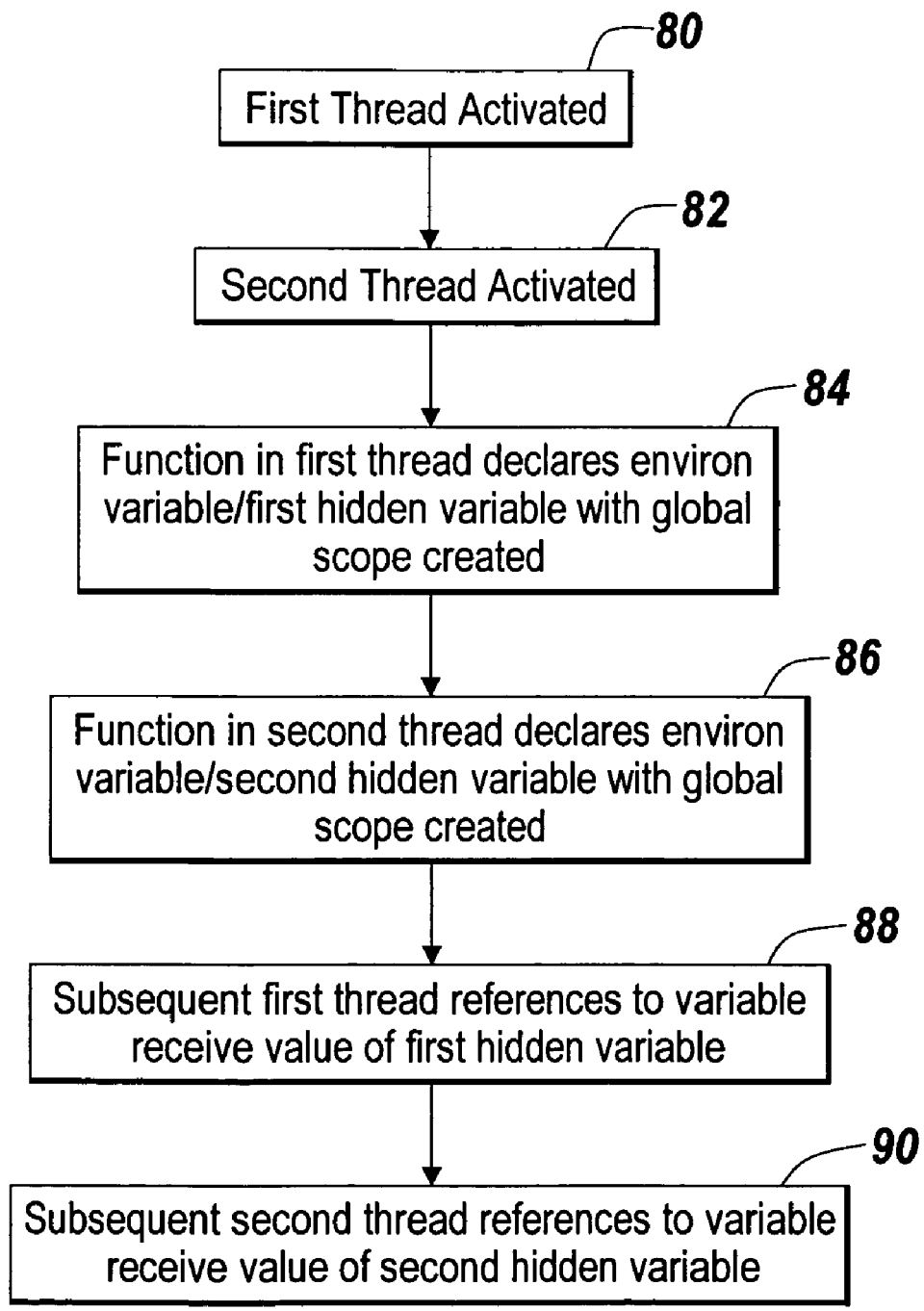
FIG. 4 is a flow chart of the sequence of steps followed by the illustrative embodiment of the present invention in a multi-threaded environment.

FIG. 4 is a flow chart of the sequence of steps followed by the illustrative embodiment of the present invention in a multi-thread environment. The sequence begins with activation of the first thread (step 80) and the second thread (step 82). A function in the first thread declares a variable of environ scope and a first shared variable is created (step 84). A copy of the function in the second thread declares a variable of environ scope and a second shared variable is created (step 86). Subsequent first thread references use the first shared variable (step 88). Subsequent second thread references use the second shared variable (step 90).

Although the illustrative embodiment of the present invention has been described as a language feature in a structured programming language, the present invention may also be practiced in an object-oriented language in which objects possess constructors and destructors in order to deliver similar functionality. A constructor is an initial method called during the creation of an object, and a destructor is a method that is called when an object is deleted or goes out of scope. In an object-oriented environment, the present invention may create a class, referred to herein as Env, and define a constructor and destructor for the class. For example, to create an environ variable of type T:

extern T xyz; XYZ=Env (xyz);

The global variable xyz of type T is first created. The variable xyz is then used as a parameter for the instantiation of an instance of class ENV. The call to the constructor creates an object that holds a local copy of xyz called XYZ. When XYZ is accessed, the value of the external variable xyz is actually returned. When XYZ is set, the value of the external variable xyz is set. When the object XYZ is destroyed, the saved value of xyz is copied back into the external xyz. Thus this object simulates the use of the custom storage class environ described above.

Figure 5:
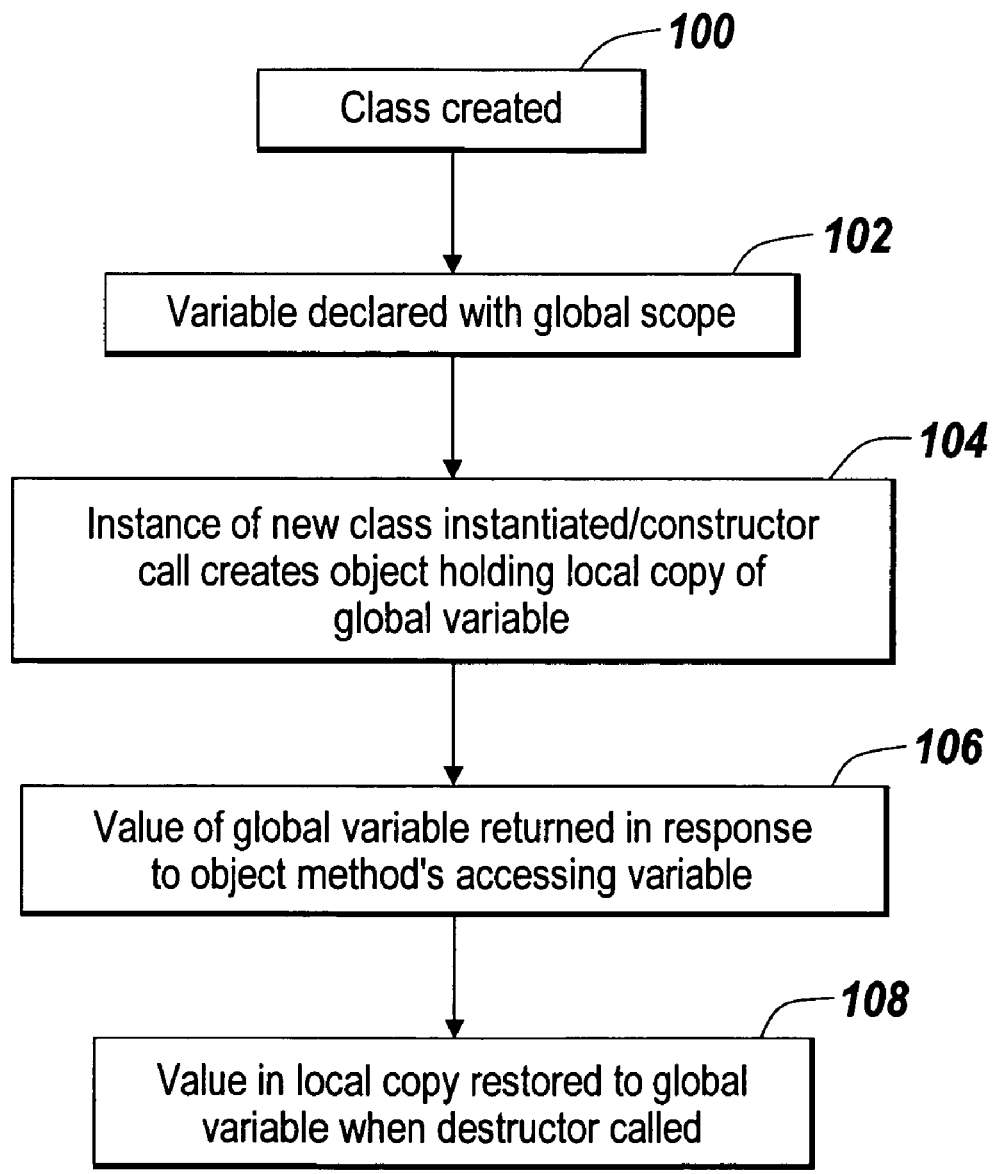
FIG. 5 is a flow chart of the sequence of steps followed by the illustrative embodiment of the present invention in an object-oriented environment

FIG. 5 is a flow chart of the sequence of steps followed by the illustrative embodiment of the present invention when implemented in an object-oriented environment. The sequence begins with the creation of the class Env with a constructor and destructor(step 100). It will be recognized that the name of the class is an implementation choice. A variable is then declared with a global scope (step 102). An instance of the class Env is then instantiated taking the variable with the global scope as a parameter. The call to the constructor of the class creates an object holding a local copy of the global variable (step 104). When the object accesses the local copy, the value of the global variable is returned (step 106). When the object sets the variable, it is the global variable that is set (step 108). When the destructor is called to destroy the object, the value in the local copy is restored to the global variable (step 110)

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In an electronic device with a computing environment including a language processor, a method of distributing data to called functions in an application within the computing environment, said method comprising:
   providing with the language processor a specified type of variable, said specified type of variable designating variables referenceable only from within a function;
   providing, in response to the use of a variable of the specified type by a specific function, the value of said variable most recently set by one of the specific function and a caller of the specific function;
   creating programmatically with said language processor a shared variable and a local variable in response to a declaration of the variable of the specified type, said shared variable referenceable only from within a function in said application, said local variable visible only within the function in which the declaration appears;
   assigning programmatically the value of said shared variable to said local variable when said function is entered;
   returning a value of said shared variable when providing the value of said variable in response to said variable being referenced within the function; and
   assigning programmatically the value of said local variable to said shared variable when said function returns.

2. The method of claim 1 wherein said shared variable is assigned the value of one of a global variable and hidden global variable.

3. The method of claim 1, further comprising:
   detecting an error during the execution of said function prior to said function return; and
   handling said error by transferring control to a different function, said transfer of control including the passing of the value in said local variable, said value in said local variable representing the initial value of said shared variable upon entry into the function in which the error was detected.

4. The method of claim 3, further comprising:
   setting the value of at least one of the hidden variables with a global scope in response to a command in the function.

5. The method of claim 1 wherein the value most recently set is one of a compiler option, input file name, at least one temporary file name and a handle.

6. The method of claim 1 wherein the value most recently set is used for memory allocation.

7. The method of claim 1, comprising further:
   providing a debugger version of a storage allocator, said debugger running only on a selected set of functions in said application.

8. The method of claim 1, wherein more than one thread is active at a time in said computing environment and each thread includes a separate shared variable referenceable only from within a function that is associated with a variable declared in a different copy of the selected function.

9. The method of claim 1, further comprising:
   setting the value of the value most recently set in response to a command in the function.

10. In an electronic device with a computing environment including a language processor, a medium holding executable steps for a method of distributing data to called functions in an application within the computing environment, said method comprising:
   providing with the language processor a specified type of variable, said specified type of variable designating variables referenceable only from within a function;
   providing, in response to the use of a variable of the specified type by a specific function, the value of said variable most recently set by one of the specific function and a caller of the specific function;
   creating programmatically with said language processor a shared variable and a local variable in response to a declaration of the variable of the specified type said shared variable referenceable only from within a function in said application said local variable visible only within the function in which the declaration appears;
   assigning programmatically the value of said shared variable to said local variable when said function is entered;
   returning a value of said shared variable when providing the value of said variable in response to said variable being referenced within the function; and
   assigning programmatically the value of said local variable to said shared variable when said function returns.

11. The medium of claim 10 wherein said shared variable is assigned the value of one of a global variable and hidden global variable.

12. The medium of claim 10, wherein said method further comprises:
  detecting an error during the execution of said function prior to said function return; and
  handling said error by transferring control to a different function, said transfer of control including the passing of the value in said local variable, said value in said local variable representing the initial value of said shared variable upon entry into the function in which the error was detected.

13. The medium of claim 12, wherein said method further comprises:
  setting the value of at least one of the hidden variables with a global scope in response to a command in the function.

14. The medium of claim 10 wherein the value most recently set is one of a compiler option, input file name, at least one temporary file name and a handle.

15. The medium of claim 10 wherein the value most recently set is used for memory allocation.

16. The medium of claim 10, wherein said method further comprises:
  providing a debugger version of a storage allocator, said debugger running only on a selected set of functions in the application.

17. The medium of claim 10, wherein more than one thread is active at a time in said computing environment and each thread includes a separate shared variable associated with a variable declared in a different copy of the selected function, said shared variable referenceable only from within the function.

18. The medium of claim 10, wherein said method further comprises:
  setting the value of the value most recently set in response to a command in the function.

19. In an electronic device with an object-oriented programming environment, a method comprising:
  declaring a variable with global scope;
  creating programmatically a class with a constructor and destructor with a language processor, said constructor creating a local copy of said variable with global scope;
  calling said constructor while instantiating an object of said class;
  assigning programmatically the value of said variable with global scope to said local copy of said variable with global scope when said object is instantiated;
  returning a value of said variable with global scope when said object is referenced, said value being a value most recently assigned to the variable with global scope by an existing object; and
  calling a destructor for said object, said destructor assigning programmatically the value of said local copy of said variable with global scope to said variable with global scope when said object is destroyed.

20. The method of claim 19, further comprising:
  setting the value of the variable with global scope in response to a set command in the object.

21. The method of claim 19, further comprising:
  detecting an error during the execution of a method of said object; and
  handling said error by transferring control to a different method, said transfer of control including the passing of the value in said local copy of said variable with global scope, said value in said local copy of said variable representing the initial value of said variable with global scope upon the instantiation of said object.

22. The method of claim 19, wherein more than one thread is active at a time and each thread includes a separate variable of global scope associated with a local copy of the variable with global scope declared in a different object.

23. The method of claim 22, further comprising:
  setting the value of at least one of the variables with global scope in response to a command in the object.

24. The method of claim 19 wherein the value of said declared variable is one of a compiler option, input file name, at least one temporary file name and a handle.

25. The method of claim 19 wherein the value of said declared variable is used for memory allocation.

26. The method of claim 19, comprising further:
  providing a debugging version of a storage allocator, said debugger running only on a selected set of program modules in an application.

27. In an electronic device holding a computing environment including a language processor, a medium holding a method, said method comprising:
  declaring a variable with global scope;
  creating programmatically a class with a constructor and destructor with the language processor, said constructor creating a local copy of said variable with global scope;
  calling said constructor while instantiating an object of said class;
  assigning programmatically the value of said variable with global scope to said local copy of said variable with global scope when said object is instantiated;
  returning a value of said variable with global scope when said object is referenced, said value being a value most recently assigned to the variable with global scope by an existing object; and
  calling a destructor for said object, said destructor assigning programmatically the value of said local copy of said variable with global scope to said variable with global scope when said object is destroyed.

28. The medium of claim 27, wherein said method further comprises:
  setting the value of the variable with global scope in response to a set command in the object.

29. In an electronic device with a programming environment, a method of distributing data to called functions in an application, said method comprising:
  providing with a language processor a variable type with a defined scope and visibility;
  declaring a variable of the defined type in a selected function;
  creating programmatically a global variable and local variable with the language processor in response to said declaration, said global variable referenceable only from within a function, said local variable visible only within the function in which the declaration appears;
  assigning programmatically the value of said global variable to said local variable when said function is entered;
  returning a value of said global variable when said declared variable is referenced within the function, said value being a value most recently assigned to the variable by an active caller of the function; and
  assigning programmatically the value of said local variable to said global variable when said function returns.

30. The method of claim 29, further comprising:
  detecting an error during the execution of said function prior to said function return; and
  handling said error by transferring control to a different function, said transfer of control including the passing of the value in said local variable, said value in said local variable representing the initial value of said global variable upon entry into the function in which the error was detected.

31. The method of claim 29 wherein the value of said declared variable is one of a compiler option, input file name, at least one temporary file name and a handle.

32. The method of claim 29 wherein the value of said declared variable is used for memory allocation.

33. In an electronic device with a computing environment including a language processor, a method of distributing data to called functions in an application within the computing environment, said method comprising:
creating a storage class describing how a variable is stored;
declaring a variable of the created storage class in a selected function;
creating programmatically with said language processor a hidden variable with a global scope and a hidden local variable in response to said declaration, said hidden variable with a global scope referenceable only from within a function, said hidden local variable visible only within the function in which the declaration appears;
assigning programmatically the value of said hidden variable with a global scope to said hidden local variable when said function is entered;
returning a value of said hidden variable with a global scope when said declared variable is referenced within the function, said value being a value most recently assigned to the variable by an active caller of the function; and
assigning programmatically the value of said hidden local variable to said hidden variable with a global scope when said function returns.

34. The method of claim 33, further comprising:
setting the value of the hidden variable with a global scope in response to a command in the function.

35. The method of claim 33, further comprising:
detecting an error during the execution of said function prior to said function return; and
handling said error by transferring control to a different function, said transfer of control including the passing of the value in said hidden local variable, said value in said hidden local variable representing the initial value of said hidden variable with a global scope upon entry into the function in which the error was detected.

36. A system for providing access to shared data, the system comprising:
an electronic device; and
a programming environment executing on the electronic device, the programming environment including:
a language processor providing a specified type of variable, the specified type of variable designating variables that are referenceable only from within a function; and
a program with a plurality of functions, at least a designated one of the plurality of functions using a variable of the specified type, the variable in the designated function receiving the value of the variable of the specified type most recently set by one of the designated function and a caller of the designated function;
wherein the language processor creates the shared variable and a local variable in response to a declaration of the variable of the specified type, the shared variable referenceable only from within a function in the program, the local variable visible only within the function in which the declaration appears;
wherein the value of the shared variable is assigned programmatically to the local variable when a function using the specified type of variable is entered, and the value of the local variable is assigned programmatically to the shared variable when the function using the specified type of variable returns; and
wherein the value of the shared variable is returned when the declared variable is referenced within the function, the value being a value most recently assigned to the shared variable by an active caller of the function.

* * * * *

UNITED STATES PATENT AND TRADEMARK OFFICE
CERTIFICATE OF CORRECTION

PATENT NO.         : 7,584,452 B1                                                Page 1 of 1
APPLICATION NO.    : 10/955399
DATED              : September 1, 2009
INVENTOR(S)        : Steve Johnson It is certified that error appears in the above-identified patent and that said Letters Patent is hereby corrected as shown below:

In the Specification, at Column 5, Line 62, of the printed patent, "The," should be --The--.

In the Specification, at Column 6, Line 17, of the printed patent, "functions" should be --function f--.

In the Specification, at Column 6, Line 22, of the printed patent, "X When" should be --X. When--.

In the Specification, at Column 6, Line 32, of the printed patent, "from X" should be --from _X--.

In the Specification, at Column 8, Line 53, of the printed patent, "off" should be --of f--.

In the Claims, at Column 10, Line 57 (Claim 10, Line 15), of the printed patent, "type" should be --type,--.

In the Claims, at Column 10, Line 59 (Claim 10, Line 17), of the printed patent, "application" should be --application,--.

Signed and Sealed this

First Day of December, 2009

David J. Kappos
*Director of the United States Patent and Trademark Office*